Feb. 23, 1954
A. HAARMANN
2,670,170
PIT PROP
Filed March 22, 1950
2 Sheets-Sheet 1
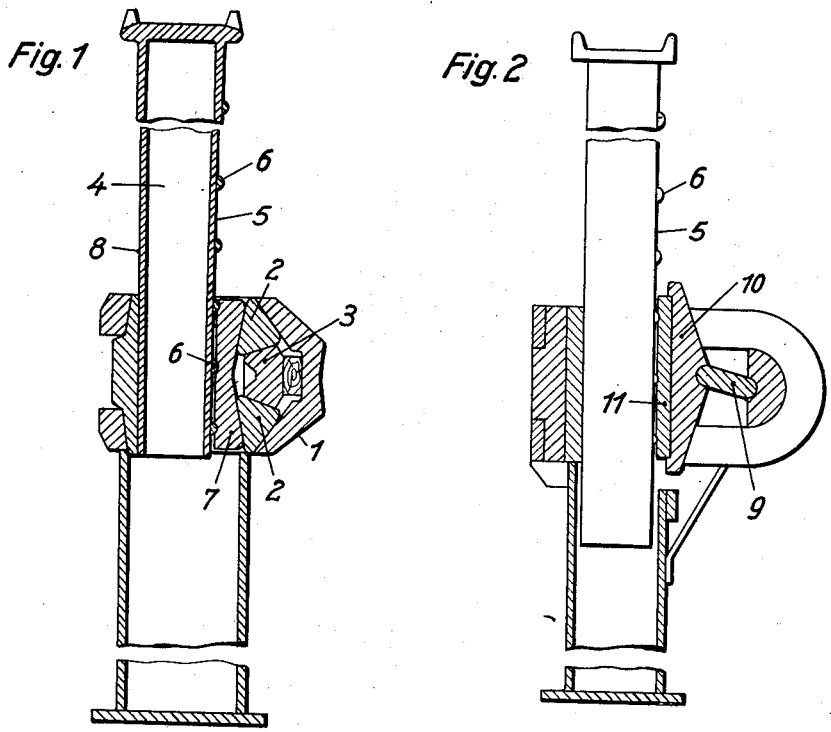
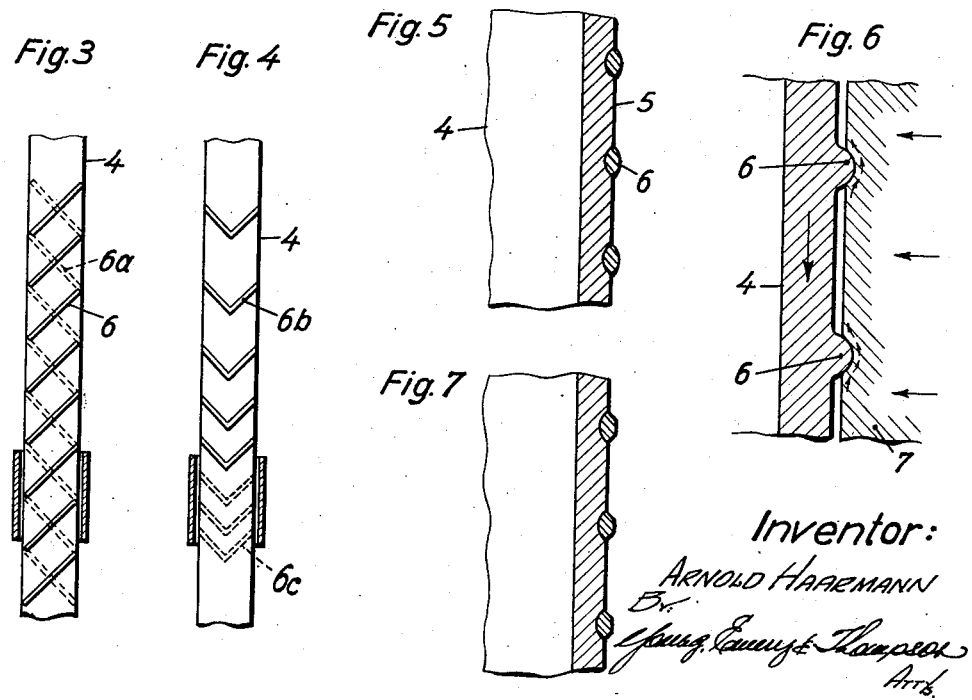
Inventor:
ARNOLD HAARMANN Feb. 23, 1954　　　A. HAARMANN　　　2,670,170
PIT PROP Filed March 22, 1950　　　　　　　　　　2 Sheets-Sheet 2

Inventor:
ARNOLD HAARMANN
By
Young, Emery & Thompson
Attys.

Patented Feb. 23, 1954

2,670,170

UNITED STATES PATENT OFFICE 2,670,170

PIT PROP

Arnold Haarmann, Brambauer, Westphalia, Germany

Application March 22, 1950, Serial No. 151,240

6 Claims. (Cl. 248—354)

This invention relates to improvements in pit props of the kind in which the part of the prop which is movable relatively to a lock, preferably the inner prop is provided with ribs which are arranged on a wedge shaped surface one above the other and engage a support of said lock.

The bearing strength of pit props with insertable inner prop clamped by a lock (or clamp) is determined by the horizontal stress produced in the lock. This horizontal stress is generally produced by the inner prop itself which is pushed in by the pressure of mountain mass said inner prop being in most cases for this purpose wedge shaped in longitudinal direction.

In older prop constructions having a wedge arrangement a pressure way curve resulted ascending mainly inclined or curve shaped so that the necessary bearing strength was obtained only after the inner prop has sunk in a longer way.

If one wants to obtain a great bearing strength at a shorter push in way then a tension member (for instance a swing wedge or a drag friction wedge) has to be arranged in the lock which said tension member is indirectly or directly carried along a short length of way by the inner prop at the beginning of the push in movement of the inner prop.

In order to prevent that the horizontal stress acting on the casing or the straps of the lock becomes excessively great and at the same time also to prevent that the member (for instance a horizontal wedge) provided for loosening the lock is too much strained, it is necessary to produce in the lock great friction forces between the inner prop and the parts of the lock which parts co-operate with the inner prop. It has been suggested to employ for this purpose the "key way friction" and/or to insert friction packings having a great coefficient of friction (for instance aluminium alloys). A reliable carrying of the drag wedge (friction wedge) by the inner prop will be achieved only if the friction between the said drag wedge and the inner prop is substantially greater than the friction between the drag wedge and the lock. In order to produce such a differentiation of the friction it has been suggested to provide the drag wedge at the side facing the prop with a packing having a great coefficient of friction (aluminium alloy) and at the side facing the lock with a packing having a very small coefficient of friction (for instance stainless steel) or to insert roller members at the side facing the lock. These devices do not work with sufficient reliability of operation at the rough mine working and through the great dispersion of the coefficient of friction.

It has been proved that the friction between drag wedge and inner prop is greatly decreased in course of time as the surface of the inner prop becomes smooth and this causes a disadvantageous change of the characteristic of the prop.

From the beginning of pit prop design development suggestions are known according to which the gliding surface of the inner prop wedge shaped in longitudinal direction is made rough in such a way that at very small distances superposed arranged saw like ribs are formed, said ribs planing off shavings of a wooden lining block provided in the lock, by the sliding movement of the inner prop. Such suggestions have been proved useless because the grooves between the knives or saw teeth become very quickly blocked by the loosened shavings and the soft lining are very quickly destroyed. Such means cannot be employed in up to date pit props with high bearing strength which props require the employment of lock linings of steel or resistive metal for cooperating with the inner prop.

According to a still older suggestion the lower face edge of a tubular prismatic inner prop is designed as cutting knife cutting off a chip of great strength from the web of a T-iron provided in the lock. This construction is also utterly unsuitable for modern requirements as the bearing strength decreases rapidly as soon as the cutting edge has passed the lower end of the T-iron to be planed off. Moreover, such a prop does not permit an adoption for various thickness of the seam.

It is an object of the present invention by avoiding the described disadvantages to increase considerably the friction between inner prop and the associated lock support or supports without causing inadmissible wear. In order to achieve this object the present invention goes back to the before described conception which has been abandoned long ago, i. e. to provide at least one gliding surface of the inner prop with ribs lying superposed on a wedge surface and engaging an inserted member of the lock; according to this invention, however, special ribs of a small height (for instance 2-3 mm.) made of hard material—preferably of hard metal—are provided at least on one gliding surface of the inner prop at great vertical distances and in such a way that within the region of the inner prop simultaneously a few ribs only—but at least one rib—engage the lock support made of steel or resistive metal. Said ribs shall be formed of welded ridges of hard metal, the support made of steel or metal must, of course, have a lesser hardness than the ribs. Experiments have proved that but ribs which are arranged at a relatively great distance from each other and engage consequently the lock support with a small portion only of their whole surface produce so high surface pressures that they actually penetrate a bit into the support if such support is made of steel or a hard metal. The size of the respectively effective surface of the said ribs as well as their hardness and the hardness of the lock support can be balanced with each other at will so that an inadmissible wear of the lock support will be prevented even when the prop is frequently used.

It is another object of the invention to avoid that shavings are planed off or that a planing takes place to any considerable extent; this object is achieved by providing respectively ribs and ridges which have a round, or preferably a semicircular cross section, or oblique edges. This construction is based on the discovery that the material which the support is made of is no longer subjected to a planing action but worked or kneaded for it flows round the ridges as may well be said. The wear and tear of the support is correspondingly low as could be found out by experiments. A prop constructed in accordance with the invention was pressed through fifty times but the wear and tear of the support amounted to 2 mm. at the most; the surface had become scaly and leaf-like.

According to a preferred embodiment of the invention the ribs are put on, especially welded on, the inner prop as special elements. Just in this way ribs of great hardness can be used.

It is possible to use for pit props according to the present invention props made even of structural steel of usual strength of about 50–60 kg./mm.² the toughness and elongation of which is so great that they do not break suddenly under high pressure of the rock but that they only bend.

The present invention is with particular advantage applied in such props in which the horizontal stress in the lock is made so high before or at a short way by beginning to push in the inner prop (for example by a swing wedge, eccentric or drag wedge (friction wedge) governed by the inner prop) that the height of the stress corresponds to the full bearing strength or to a substantial part of it. The ribs provided according to the present invention can be arranged on the props of this kind in such a way that they come into effect only in exceptional cases, i. e. when the pressure of the rock exceeds the normal bearing strength which corresponds to the high horizontal stress produced by the described means at the setting of the prop or at the beginning of the push in movement.

On the other hand, there are no objections to employ the object of the present invention also at props with a gradually ascending pressure—way curve i. e. with a greater pliability and even a special advantage of the present invention lies in the fact that the pliability of such obsolete props can be reduced by the means according to this invention.

According to the desired characteristic the ribs can be provided on the entire length of the inner prop or in the upper region only and in a given case also in the middle region of the inner prop.

It is suitable especially for relatively rigid props of great length to confine the ribs to the upper region and in a given case to the middle region in order to prevent that an overstraining respectively and exceeding of the breaking resistance of the upper prop results when in extended condition in consequence of a great increase of the horizontal stress. There are, of course, no objections to increase by other means (for instance metallic coating as zinc (galvanizing), aluminium or such like) the friction of the gliding surface of the prop in the lower region which region is without ribs, as far as the characteristic of the prop and the resulting breaking loads permit.

The ribs can be arranged inclined with regard to the longitudinal axis of the prop and it is then suitable that they overlap one another with their ends turned against each other. A suitable construction will be obtained when the ribs are angularly arranged preferably the vertex pointing downwards.

In order to increase the resistance of the prop against sinking down in correspondence with the extent by which the prop is pushed in, the distance of the ribs is to be suitably enlarged in upward direction thereby the specific pressure of the ribs is increased in correspondence with the extent by which the inner prop is pushed in.

When utilizing the present invention for upper props wedge shaped in longitudinal direction the ribs may have the same height. But it is also possible to increase slightly the height of the ribs in the upper region of the inner prop whereby the resistance against the push in at progressing of the sinking down of the upper prop will also be improved.

In case prismatic inner props are used, the ribs following one another in the direction from below to the top have to be increased progressively in height thereby substituting the wedge shaped form of the upper prop.

The inner prop itself can be made of steel or a light alloy of suitable strength, and it may be of any cross section.

A further improvement of the invention consists in that the ribs or ridges are provided on a special bearing surface connected with the gliding surface of the inner prop. This design is applicable in case the inner prop consists of different material.

The invention is of particular importance with respect to inner props consisting of light metal (e. g. Duralumin) for it is from a practical point of view impossible or at least very difficult to provide ribs or ridges of hard metal immediately on a light metal. The bearing surface provided respectively for the ribs and ridges may consist of any suitable material, preferably of steel. In many cases bearing surface and ribs may consist of the same material or be made of one piece. In case a band-like bearing surface (consisting e. g. of steel) is used it needs but a low thickness, e. g. of 4 mm.

The bearing surface may be attached in different ways. The fastening at the lower end of the inner prop is of particular importance.

The invention will appear more clearly from the following detailed description when taken in connection with the accompanying drawings, showing by way of example, preferred embodiments of the inventive idea.

Figures 1 and 2 are sectional elevations of two different designs of props provided with ribs in accordance with this invention;

Figures 3 and 4 show different arrangements of ribs;

Figures 5–7 show different cross sections of ribs;

Figure 8:
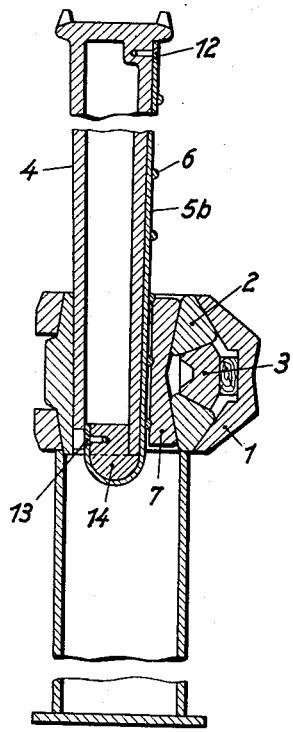
Figure 8 is a sectional elevation of a prop the bearing surface of which consists of a steel band provided with ribs.

Figure 1 shows a prop of greater pliability in the lock 1 of which a wedge arrangement 2, 3 is provided whereby 3 is the tightening and loosening wedge. Ridges 6, consisting for instance of hard metal are welded on the inner prop; they are arranged on the wedge shaped gliding surface 5 of the inner prop one above the other in distances with regard to the height; they are capable of pressing themselves in the support 7 of the lock 1, said support consisting, e. g., of steel or some other resistive metal. The ribs 6 can be arranged, according to Figure 3, parallel to each other and inclined in such a way that they overlap each other with their ends turned to each other. When the gliding surface 8 opposite the surface 5 is also provided with ribs 6a then it is suitable to incline these ribs in reverse direction as it is shown by broken lines 6a in Figure 3. The height of the distance of the ribs 6 and 6a respectively from each other is according to the embodiment of the invention shown in the drawing chosen in such a way that always two ribs engage the support 7.

The ribs can also be made in an angular design 6b as illustrated in Figure 4.

Figure 2 shows a prop with rigid characteristic of known design. A tension wedge 9, swingable in a small angle in a vertical plane, is arranged in the lock, said wedge 9 supporting with its inner end against a pressure jaw 10 which has a packing 11 cooperating with the ribs 6. At the beginning of the push in movement of the inner prop (for example during a way of 15–20 mm.) the wedge 9 will be turned to an approximately horizontal position and the lock will thereby be brought to a great horizontal stress as the pressure jaw 10 including the packing 11 is carried along. The inner prop illustrated in Figure 2 can be prismatic designed or it can be very slightly wedge shaped in vertical direction. In the shown example of design the height of the ribs increases from below to the top. By the way, in Figure 1 as well as in Figure 2 the height of the ribs is shown in an exaggerated way. The ribs in the lower region can be omitted so that the ribs become effective only after the prop pushed together has obtained a higher breaking strength and thereby permits a greater load (see ribs 6c shown in broken lines in Figure 4).

It can be seen in Figure 4 that the vertical distances of the ribs may be increased upwards.

As may be seen from Figures 5–7 the edges of the ribs projecting beyond the section of the prop may have a round, oblique, or a semi-circular cross section. According to Figures 5 and 7 the ribs are inserted into the section of the prop or welded on. According to Figure 6 the ribs are made of the same material the prop consists of; in this case the ribs must eventually be hardened depending on the material the support 7 the ribs are engaging is made of.

The prop illustrated in Figure 8 has a special bearing surface consisting of a steel band 5b said band being put on or attached to the prop and provided with respectively ribs and welded ridges 6.

Figure 9:
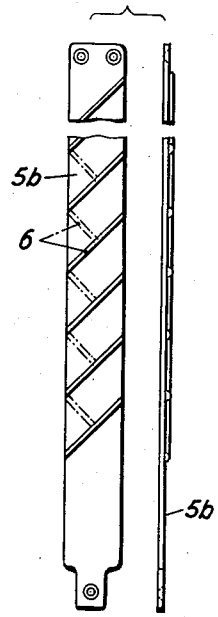
Figure 9 is a front and side view of a steel band provided with ribs.

In the embodiment of the invention shown in the drawing the bearing surface 5b is made of a steel band having a high strength which band is fastened by at least one screw 12 at its upper end. The lower end of the bearing surface 5b which is bent upward like a hook encloses a fitting piece 14 inserted into the lower end of the inner prop. The fitting piece is cylindrically shaped at its bottom surface so as to avoid edges which enhance the danger that the bearing surface is liable to break. The screw 13 serves for fastening the hook like end of the bearing surface to the fitting piece. The hook like end may as well be clamped between the fitting piece and the inner side of the inner prop. For the sake of fastening the lowermost end of the bearing surface is tapering on both its sides as may be seen from Figure 9.

Figure 10:
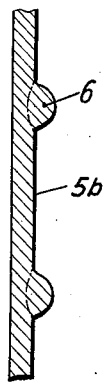
Figure 10 is a sectional elevation of a part of a steel band on an enlarged scale.
Figure 11:
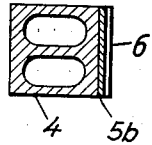
Figures 11 and 12 show different forms of cross sections of inner props provided with special bearing surfaces attached to them.
Figure 12:
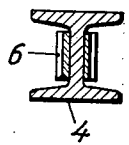
Figure 13:
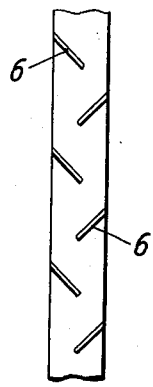
Figure 13 shows still another arrangement of ribs.

As shown in Figure 10 the ribs 6 and the bearing surface may be made of the same material. In many cases, however, said ribs of the bearing surface 5b may be obtained by welding ridges on it. The bearing surface for the ribs may be provided on one or both gliding surfaces of the inner prop (s. Figures 11 and 12). In case the ribs are welded on a steel band it is of particular advantage to arrange the ribs according to a fish-bone pattern as illustrated in Figure 13 for the pulling strain will always be transmitted in zigzag through parts of steel which are free from welding.

The inventive idea may be applied to props differing in cross section and locking means from those shown in the drawing.

What I claim is:

1. A mine prop comprising a lower section, an inner section guided in the lower section and having at least an exterior face on which are secured a plurality of small outwardly rounded ribs vertically spaced one above the other, the distance between the ribs being a multiple of the width of each rib and the ribs being of a material which is harder than the material of the inner section, a pressure jaw provided on the lower section where the inner section enters the lower section and having a smooth outer face and which consists of a hard material which is softer than the rib material, the jaw being longer than the width of the inner section, and a lock member provided around the jaw to which it is fastened.

2. A mine prop according to claim 1, in which the ribs consist of a hard metal welded on the inner section as ridges.

3. A mine prop according to claim 1, in which the height of said ribs increases from the lower to the higher ribs on said inner prop.

4. A mine prop according to claim 1, in which the ribs are arranged in an upwardly increasing distance from each other.

5. A mine prop comprising an outer prop portion, an inner prop tapering longitudinally and movable telescopically relative to said outer prop portion in its longitudinal direction, a lock secured on said outer prop where the inner prop telescopically enters the outer prop and having a support member, said support member and inner prop being relatively movable, a bearing surface consisting of a steel band connected to the inner prop and constituting the contacting surface of said inner prop and having ribs provided thereon, said ribs consisting of a material which is harder than the material of said support of said inner prop, and said ribs being arranged one above the other in a spaced relationship with a distance from each other great enough so that only a few ribs engage said lock support member at one time.

6. A mine prop comprising an outer prop portion, an inner prop tapering longitudinally movable telescopically relative to said outer prop portion in its longitudinal direction, and having an inclined surface, a lock secured on said outer prop where the inner prop telescopically enters the outer prop and having a support member, ribs provided on said inclined surface to engage the support member and consisting of a material which is harder than the material of said support member, said ribs being arranged one above the other in a spaced relationship whereby at least two ribs will engage the support member.

ARNOLD HAARMANN.

References Cited in the file of this patent

UNITED STATES PATENTS

| Number | Name | Date |
|---|---|---|
| 561,210 | Downey | June 2, 1896 |

FOREIGN PATENTS

| Number | Country | Date |
|---|---|---|
| 44,014 | Netherlands | Sept. 15, 1938 |
| 308,883 | Germany | Nov. 1, 1918 |
| 823,057 | France | Jan. 13, 1938 |